United States Patent
Malloy et al.

(10) Patent No.: US 6,167,905 B1
(45) Date of Patent: Jan. 2, 2001

(54) DIAPHRAGM-TYPE GAS PRESSURE REGULATOR WITH DROP-IN VALVE SUBASSEMBLY

(75) Inventors: Patrick S. Malloy, Marshalltown, IA (US); George E J Schweitzer, Lincoln; Timothy J. Stewart, Nebraska City, both of NE (US)

(73) Assignee: American Meter Company, Horsham, PA (US)

(*) Notice: Under 35 U.S.C. 154(b), the term of this patent shall be extended for 0 days.

(21) Appl. No.: 09/315,321

(22) Filed: May 20, 1999

(51) Int. Cl.[7] .................................................. G05D 16/02
(52) U.S. Cl. .................................. 137/484.4; 137/505.46
(58) Field of Search ........................... 137/484.2, 484.4, 137/505.46

(56) References Cited

U.S. PATENT DOCUMENTS

| | | | |
|---|---|---|---|
| 1,537,704 | * 5/1925 | Rumpf | 137/505.46 |
| 2,095,210 | * 10/1937 | Bucknam | 137/505.46 |
| 2,557,187 | 6/1951 | Hanssen | 50/26 |
| 2,616,659 | 11/1952 | Grahling et al. | 251/133 |
| 2,701,578 | 2/1955 | Hamilton | 137/116.5 |
| 2,729,236 | 1/1956 | Valince | 137/505.46 |
| 2,827,069 | 3/1958 | Peterson | 137/116.5 |
| 2,951,494 | * 9/1960 | Holmes | 137/505.46 X |
| 3,098,499 | * 7/1963 | Schwerter | 137/505.46 X |
| 3,160,169 | 12/1964 | Peterson | 137/315 |
| 3,623,506 | 11/1971 | Bonner et al. | 137/613 |
| 3,705,599 | 12/1972 | Sheward | 137/116.5 |
| 4,192,298 | * 3/1980 | Ferraro et al. | 128/205.24 |
| 4,842,013 | 6/1989 | Rice et al. | 137/484.4 |
| 4,889,158 | 12/1989 | Rice et al. | 137/484.4 |
| 4,972,868 | 11/1990 | Davis et al. | 137/116.5 |
| 4,972,871 | 11/1990 | Rice et al. | 137/484.4 |

* cited by examiner

Primary Examiner—Stephen M. Hepperle
(74) Attorney, Agent, or Firm—David L. Davis

(57) ABSTRACT

A diaphragm-type gas pressure regulator wherein the valve subassembly is constructed as a drop-in unit. The valve subassembly includes a diaphragm lever and a plunger valve. A seat disk is inserted in a cavity at a first end of the plunger valve and the rounded pivot end of the lever is inserted in a groove at the other end of the plunger valve. The plunger valve is then inserted into a valve guide and a lever pin is installed through the guide and the lever, thereby capturing the subassembly. This subassembly is then placed into the regulator body and a mounting plate of the valve guide is screwed down into the regulator body. The lever is lifted up and its actuator end is inserted through an opening at the bottom of the valve stem of the regulator's diaphragm assembly. An orifice member is then threadedly installed into the regulator body inlet, the end of the orifice member having a valve seat which becomes seated in the end of the plunger valve guide. In an alternate embodiment, the orifice is formed as part of the plunger valve guide.

7 Claims, 5 Drawing Sheets

DIAPHRAGM-TYPE GAS PRESSURE REGULATOR WITH DROP-IN VALVE SUBASSEMBLY

BACKGROUND OF THE INVENTION

This invention relates to gas pressure regulators of the diaphragm type and, more particularly, to an improved valve subassembly for such a regulator.

Gas pressure diaphragm-type regulators are well known in the art. In such regulators, a valve disk and a mating seat assembly are positioned between an upstream and a downstream portion of a flow path for controlling downstream pressure and gas flow by varying the valve opening, that is, the amount by which the valve disk is displaced from its associated valve seat. Gas pressure and flow regulation are achieved by modulating the valve opening to maintain the required downstream pressure while delivering the quantity of gas demanded by the load. The popular, low cost, single stage regulator includes a diaphragm assembly that acts as both the measuring and the actuation device, with the downstream pressure being applied to one side of a diaphragm against the force of an opposed, adjustable regulator spring. The spring force initially holds the diaphragm and an attached stem linkage mechanism in such a position so as to retract the valve disk from the valve seat, thereby maintaining the valve in a full open condition. As upstream pressure is introduced, gas flow occurs through the seat-to-disk opening and into the downstream side of the device. The downstream pressure force is applied against the diaphragm and enables the diaphragm to overcome the opposing regulator spring force, thereby moving the stem linkage and the valve disk to a position closer to the valve seat. In this manner, the adjustment of the regulator spring loading determines the downstream control pressure as a force equilibrium is achieved between the loading force of the spring and the force on the diaphragm from the downstream pressure. The linkage mechanism provides a mechanical advantage which enables a small diaphragm actuated by very low downstream control pressures to close the valve disk against the valve seat despite the relatively high pressure acting to push the disk away from the valve seat.

It would be desirable to have such a regulator wherein the valve subassembly including at least the stem linkage and the valve disk are constructed as a single subassembly which can be assembled outside the regulator body and then dropped as a unit into the regulator body, in order to reduce manufacturing and maintenance costs.

SUMMARY OF THE INVENTION

According to the present invention, there is provided a drop-in valve subassembly for a diaphragm-type gas pressure regulator which includes a plunger guide having a body portion with an interior chamber and a mounting portion adapted to be secured to the interior of the gas pressure regulator. The body portion has an opening for gas communication with the interior chamber. A plunger valve member is arranged for linear sliding motion within the interior chamber of the plunger guide and a seal member is secured to a first end of the plunger valve member. The seal member is adapted to cooperate with an inlet orifice valve seat so as to regulate gas flow into the regulator. A control lever having a through-bore and first and second portions each remote from the through-bore is provided and a lever pin extends through the control lever through-bore. The lever pin is mounted to the plunger guide mounting portion to define a pivot axis for the control lever which is orthogonal to the line of motion of the plunger valve member. The control lever first portion engages the plunger valve member so as to move the plunger valve member as the control lever pivots about the pivot axis and the control lever second portion is adapted to be coupled to the regulator diaphragm.

According to an aspect of the present invention, the plunger guide body portion includes a transverse partition between the plunger guide body portion opening and the interior chamber. The partition is formed with the inlet orifice valve seat as a unitary part thereof and a passage extending through the partition and the valve seat. The passage provides all gas communication between the plunger guide body portion opening and the interior chamber. Accordingly, the drop-in subassembly includes the orifice as a part thereof.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
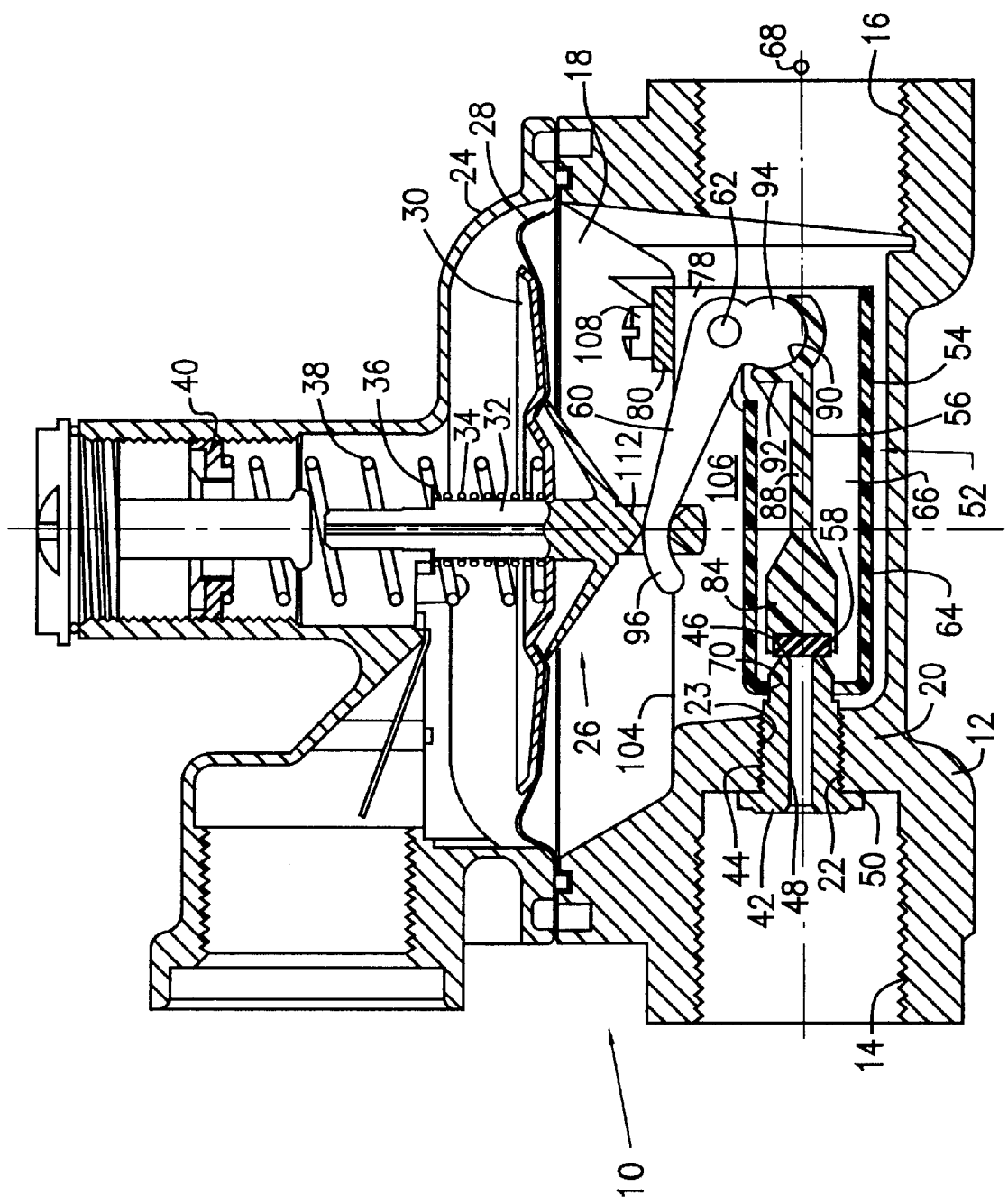
FIG. 1 is a cross section of a first embodiment of a diaphragm-type gas pressure regulator constructed in accordance with the principles of this invention.
Figure 2:
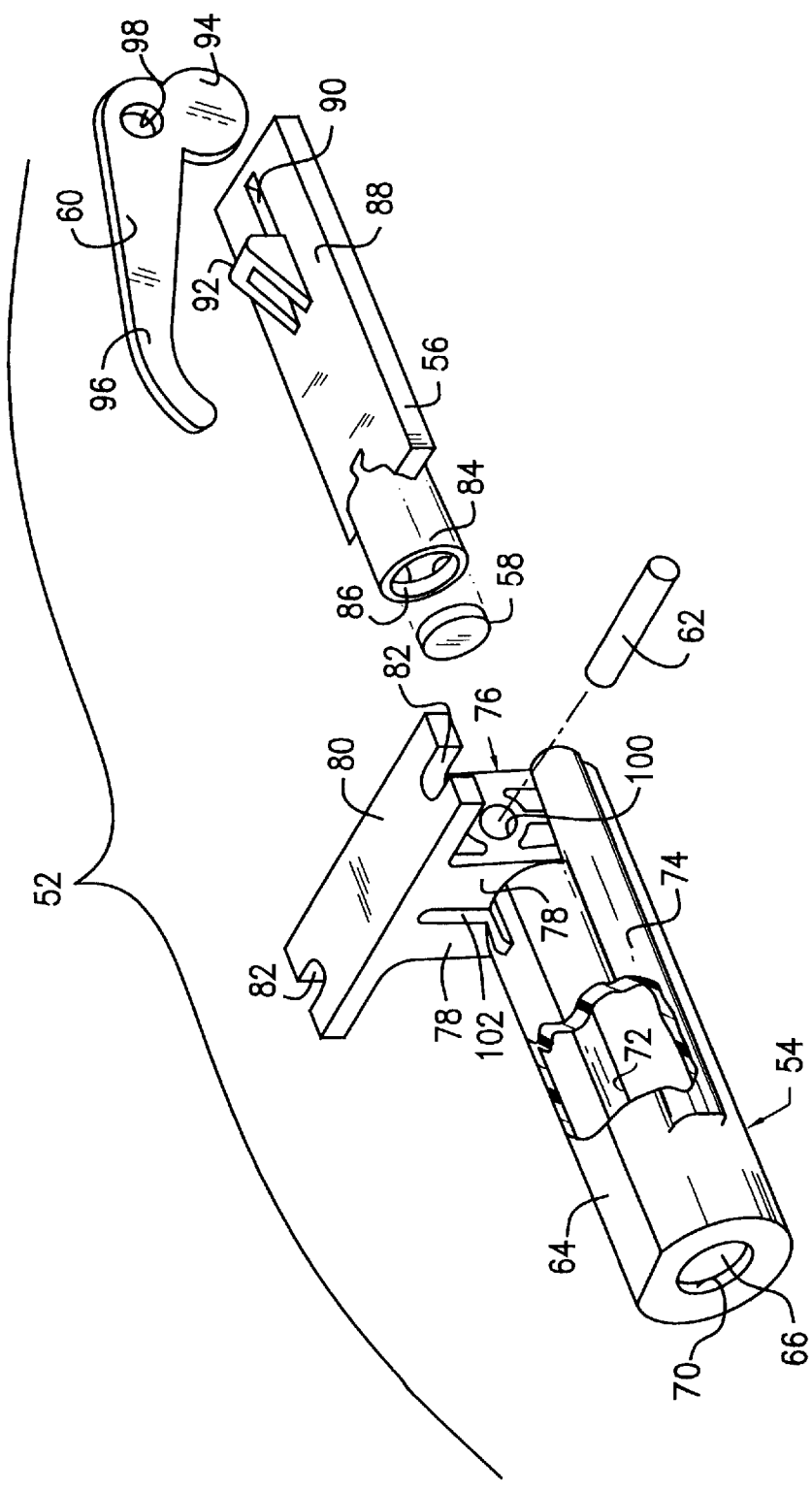
FIG. 2 is an exploded perspective view, partially broken away, of the inventive valve subassembly shown in FIG. 1.
Figure 3:
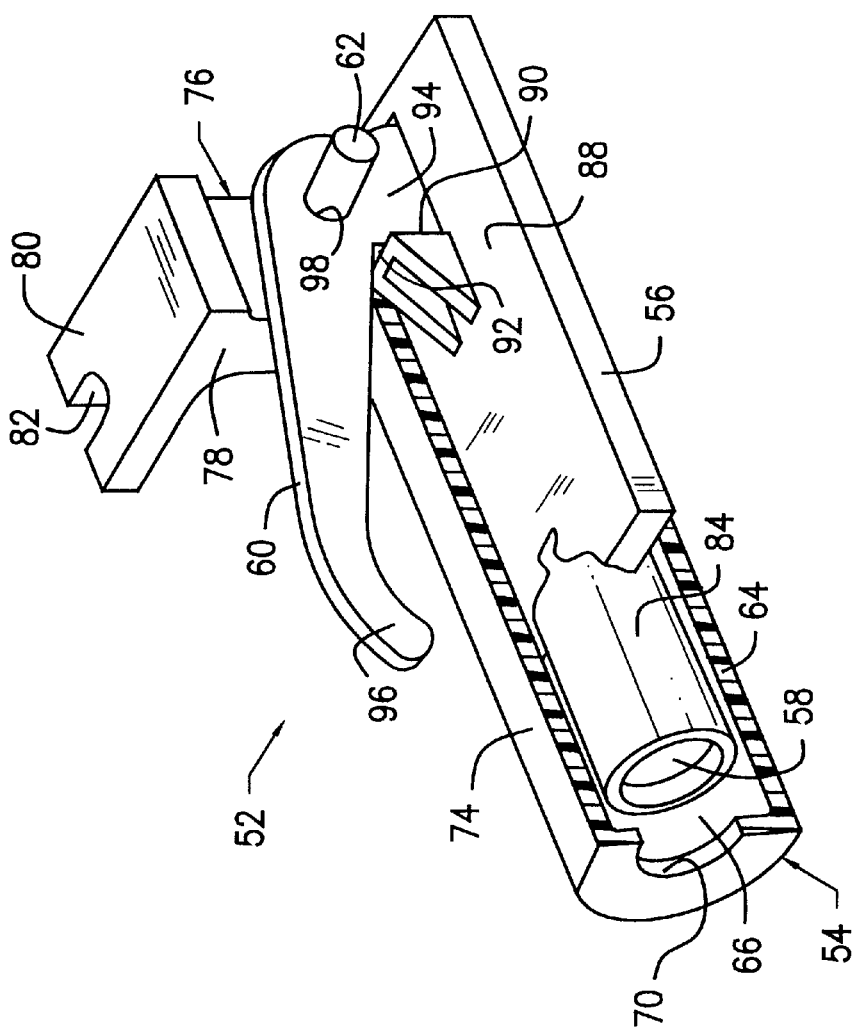
FIG. 3 is a perspective view, partially in section, of the assembled inventive valve subassembly shown in FIG. 2.

Referring now to the drawings, a first embodiment of a diaphragm-type gas pressure regulator, designated generally by the reference numeral 10, and constructed in accordance with the principles of this invention, is shown in FIG. 1. The regulator 10 includes a body 12 having an inlet 14, an outlet 16, and a valve chamber 18 communicating with the outlet 16. The regulator body 12 is formed with a wall 20 between the inlet 14 and the valve chamber 18, the wall 20 having a passageway 22 communicating with the inlet 14 and the valve chamber 18. In accordance with the first embodiment of this invention, the passageway 22 is formed with internal threads 23.

The regulator 10 also includes a top 24 which closes off the valve chamber 18. A spring-loaded diaphragm assembly 26 is captured between the top 24 and the regulator body 12. The diaphragm assembly 26 includes a diaphragm 28, a diaphragm plate 30, a valve stem 32, a relief valve spring 34, a push nut retainer 36 for the spring 34, an outlet spring 38, and an adjustment nut 40 for the outlet spring 38. These elements are conventional and well understood by those of ordinary skill in the art, and no detailed explanation of same is deemed necessary.

According to the first embodiment of the present invention shown in FIGS. 1–4, an orifice member 42 having external threads 44 is threaded into the passageway 22 of the wall 20. The orifice member 42 has a valve seat 46 at its end in the valve chamber 18 and a passage 48 which extends through the orifice member 42 and communicates with the valve seat 46 and the inlet 14. The orifice member 42 is further formed with a flange 50 at the end opposite the valve seat 46 to provide a limit when the orifice member 42 is threaded into the passageway 22.

The valve subassembly 52 according to the first embodiment of this invention includes a plunger guide 54, a plunger valve member 56, a seal member 58, a lever 60 and a lever pin 62. The plunger guide 54 includes a hollow forward body portion 64 defining an interior chamber 66 which has a longitudinal axis 68 aligned with the passage 48 of the orifice member 42. At its forward end, the forward body portion 64 is formed with an opening 70 providing gas communication with the interior chamber 66. The forward body portion 64 is also formed with a pair of opposed longitudinal grooves 72 extending into exterior projections 74 from the interior chamber 66. The grooves 72 are for the purpose of guiding the plunger valve member 56, as will be described hereinafter. The plunger guide 54 is further at its rear with a mounting portion 76 which includes a pair of spaced walls 78 supporting a mounting plate 80 having opposed openings 82. Although the openings 82 are shown as being open slots, it is understood that they could also be through-apertures.

The plunger valve member 56 has a generally cylindrical forward portion 84 formed with a counter-bore 86 at its forward end. The counter-bore 86 is sized to snugly receive therein the seal member 58, which is a resilient seat disk for engaging the valve seat 46 of the orifice member 42. Rearwardly of the forward portion 84, the plunger valve member 56 is formed as a generally planar plate 88, the opposed lateral edges of which are receivable in respective ones of the grooves 72 of the plunger guide 54. At its rear, the upper surface of the plate 88 is formed with a concavity 90 of circular arc configuration. At the forward end of the concavity 90 is an upstanding buttressed wall 92. As best shown in FIG. 1, the bottom of the plate 88 below the concavity 90 is built up to provide structural rigidity to the plate 88.

The lever 60 of the valve subassembly 52 is generally plate-like and includes a first portion 94 of generally circular shape adapted to fit in the concavity 90 of the plate 88 of the plunger valve member 56. The lever 60 further includes an elongated second portion 96 remote from the first portion 94. A through-bore 98 is between the first and second portions 94, 96. The lever pin 62 is installed in the through-bore 98 and functions to mount the lever 60 for pivoting movement about a pivot axis which is orthogonal to the longitudinal axis 68. Accordingly, the walls 78 of the mounting portion 76 of the plunger guide 64 are formed with through-bores 100 into which the lever pin 62 can be inserted, as will be described hereinafter.

To assemble the inventive valve subassembly 52, the seat disk 58 is inserted into the counter-bore 86 of the plunger valve member 56. The circular portion 94 of the lever 60 is then placed in the concavity 90, with the elongated second lever portion 96 as close to the plate 88 as possible. The plunger valve member 56 is then inserted into the interior chamber 66 of the plunger guide 54, from the rear thereof, with the opposed lateral edges of the plate 88 of the plunger valve member 56 being received in the grooves 72. The elongated lever portion 96 is inserted into the space 102 between the walls 78 of the mounting portion 76 of the plunger guide 54 and the plunger valve member 56 and the lever 60 together are moved forwardly until the through-bore 98 is aligned with the through-bores 100. The lever pin 62 is then inserted through the through-bores 98, 100 to hold the elements in place while providing a pivot axis for the lever 60.

Figure 4:
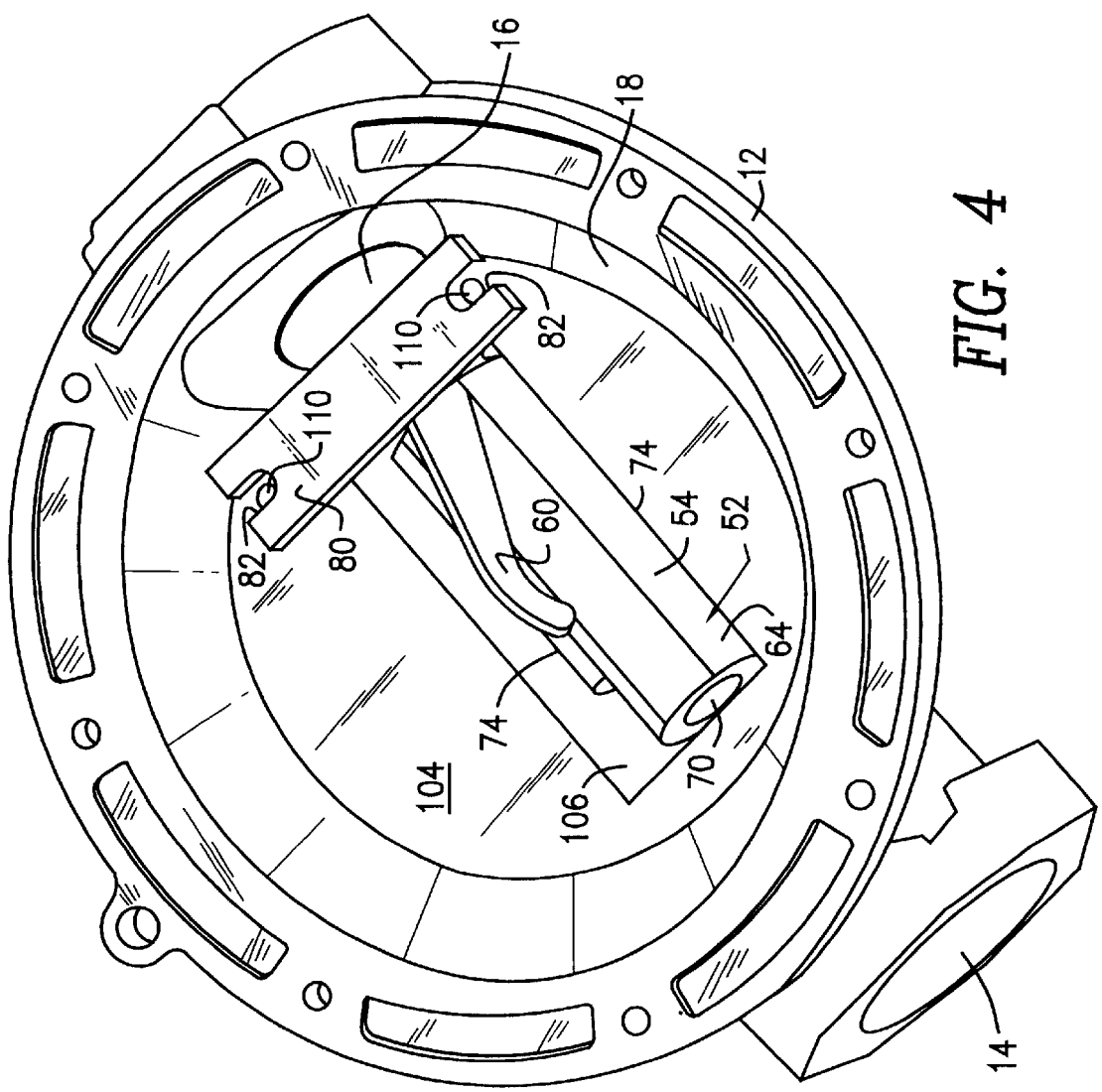
FIG. 4 is a perspective view showing the mounting of the inventive valve subassembly shown in FIGS. 2 and 3 in the regulator body shown in FIG. 1.

As shown in FIGS. 1 and 4, the valve chamber 18 of the regulator body 12 has a generally flat floor 104 above the level of the inlet 14 and the outlet 16, and a cavity 106 extending below the floor 104. The cavity 106 is at the level of the inlet 14 and the outlet 16. The cavity 106 is shaped to receive therein the valve subassembly 52, which is then held in place by screws 108 extending through the openings 82 of the mounting plate 80 and secured in the threaded openings 110 provided therefor which extend into the regulator body 12 from the floor 104. The orifice member 42 is then threaded into the. passageway 22 until its forward end containing the valve seat 46 passes through, and is seated in, the opening 70 at the forward end of the forward body portion 64 of the plunger guide 54. The diaphragm assembly 26 is then placed on top of the regulator body 12 while the elongated second portion 96 of the lever 60 is inserted through the opening 112 at the lower end of the valve stem 32. The regulator top 24 is then installed to complete the assembly, with the adjustment nut 40 providing the desired biasing force for the outlet spring 38.

During normal use of the regulator 10, as the diaphragm 28 moves up and down, the valve stem 32 likewise moves up and down. This causes the lever 60 to pivot about the-pivot axis defined by the lever pin 62. Pivoting of the lever 60 in a clockwise direction, as viewed in FIG. 1, when increasing pressure causes the diaphragm 28 to move upwardly, causes the first lever portion 94 to move against the wall 92 to cause the plunger valve member 56 to move to the left, closer to the valve seat 46, thereby reducing gas flow. When the pressure drops and the diaphragm 28 moves down, the lever 60 pivots in a counterclockwise direction to allow the plunger valve member 56 to move away from the valve seat 46, increasing the gas flow.

Figure 5:
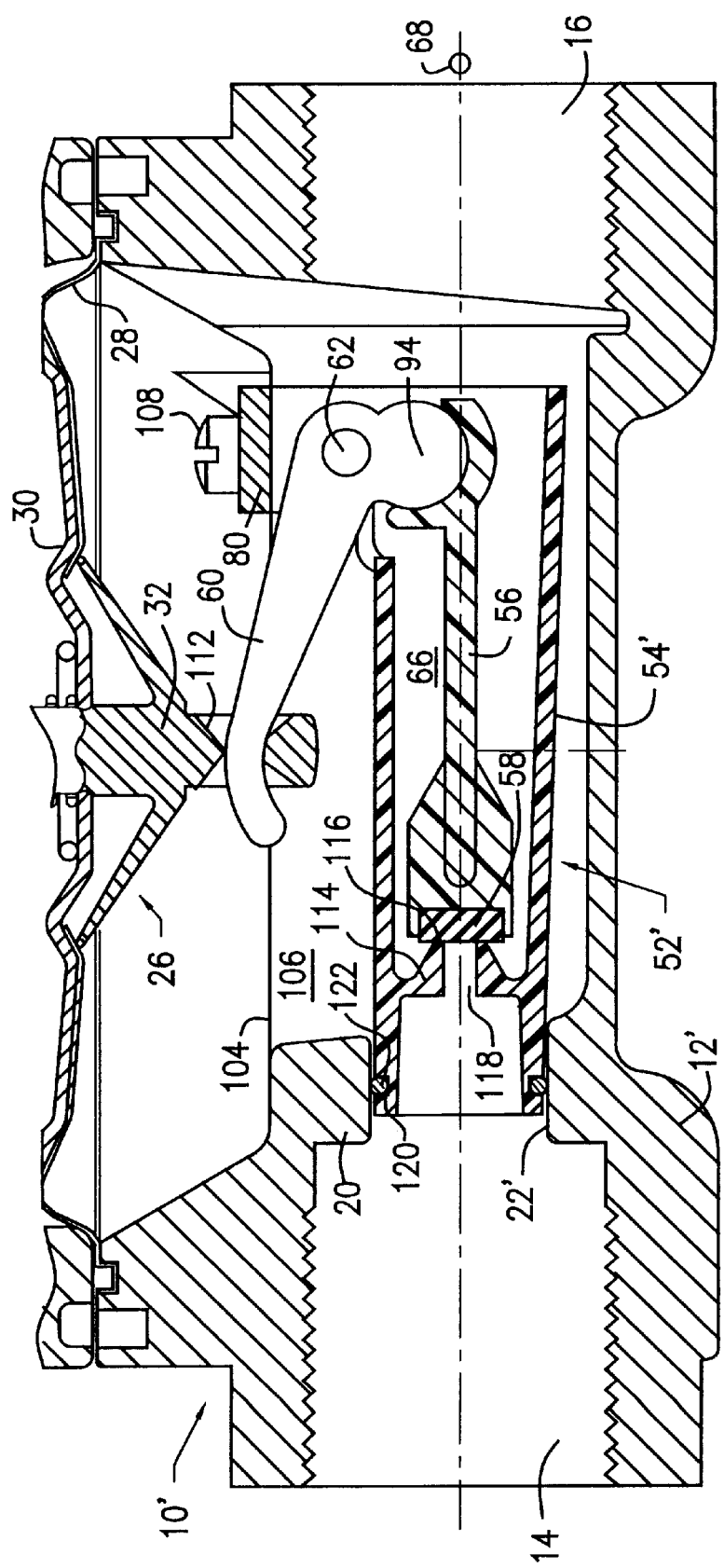
FIG. 5 is a partial cross sectional view showing an alternative embodiment of a diaphragm-type gas pressure regulator with an inventive valve subassembly according to this invention.

FIG. 5 illustrates a second embodiment of a diaphragm-type gas pressure regulator according to this invention wherein there is no separate orifice member but instead the orifice is formed unitarily as part of the plunger guide 54'. As shown in FIG. 5, the modified plunger guide 54' is formed with an elongated forward end having an interior transverse partition 114 formed to include the valve seat 116 extending into the interior chamber 66 of the plunger guide 54' and a passage 118 extending through the partition 114. To accommodate the modified plunger guide 54', the passageway 22' of the wall 24 of the regulator body 12 is not threaded, but instead is preferably of a smooth cylindrical interior configuration. The exterior of the forward portion of the plunger guide 54 is likewise preferably a smooth cylinder sized to fit within the passageway 22', and is formed with a circumferential groove 120, in which is disposed a resilient sealing ring 122. Thus, the modified valve subassembly 52' is installed in the regulator body 12' by inserting the forward end of the plunger guide 54' into the passageway 22' and then using the screws 108 to securely mount the subassembly.

Accordingly, there has been disclosed an improved diaphragm-type gas pressure regulator with a drop-in valve subassembly. While illustrative embodiments of the present invention have been disclosed herein, it is understood that various modifications and adaptations to the disclosed embodiments are possible and it is intended that this invention be limited only by the scope of the appended claims.

What is claimed is:

1. A gas pressure regulator comprising:
 a body portion having an inlet, an outlet, a valve chamber communicating with said outlet, and a wall between said inlet and said valve chamber, with said wall having a threaded passageway communicating with the inlet and the valve chamber;

orifice-containing structure having an externally threaded portion threadedly engaged in the wall passageway so as to prevent gas passage between the orifice-containing structure and the wall, the orifice-containing structure having a valve seat within the valve chamber and a passage therethrough communicating with the body portion inlet and the valve seat;

a plunger guide secured to said body portion in said valve chamber and having an interior chamber with a longitudinal axis aligned with the passage of the orifice-containing structures, said plunger guide including an end wall transverse to said longitudinal axis and having an opening communicating with said plunger guide interior chamber and said body portion valve chamber, said orifice-containing structure extending through said plunger guide end wall opening without threadingly engaging said plunger guide so that said valve seat is within said plunger guide interior chamber;

a plunger valve member contained within the plunger guide interior chamber for reciprocating movement along the longitudinal axis toward and away from the valve seat, the plunger valve member having a first end facing the valve seat;

a seal member secured to the plunger valve member first end and adapted to engage said valve seat to seal the passage of the orifice-containing structure when the plunger valve member is moved against the valve seat;

a lever mounted to said plunger guide for pivoting movement about a pivot axis orthogonal to said longitudinal axis, said lever having a first portion remote from said pivot axis and engaging said plunger valve member to move said plunger valve member toward and away from said valve seat as said lever pivots about said pivot axis, and said lever having a second portion remote from said pivot axis; and a pressure responsive control assembly sealing said valve chamber, said control assembly having a movable member coupled to the second portion of said lever to cause said lever to pivot about said pivot axis in response to pressure variations in said valve chamber.

2. A gas pressure regulator comprising:

a body portion having an inlet, an outlet, a valve chamber communicating with said outlet, and a wall between said inlet and said valve chamber, with said wall having a passageway communicating with the inlet and the valve chamber;

orifice-containing structure mounted in the wall passageway so as to prevent gas passage between the orifice-containing structure and the wall, the orifice-containing structure having a valve seat within the valve chamber and a passage therethrough communicating with the body portion inlet and the valve seat;

a plunger guide secured to said body portion in said valve chamber and having an interior chamber with a longitudinal axis aligned with the passage of the orifice-containing structure;

a plunger valve member contained within the plunger guide interior chamber for reciprocating movement along the longitudinal axis toward and away from the valve seat, the plunger valve member having a first end facing the valve seat;

a seal member secured to the plunger valve member first end and adapted to engage said valve seat to seal the passage of the orifice-containing structure when the plunger valve member is moved against the valve seat;

a lever mounted to said plunger guide for pivoting movement about a pivot axis orthogonal to said longitudinal axis, said lever having a first portion remote from said pivot axis and engaging said plunger valve member to move said plunger valve member toward and away from said valve seat as said lever pivots about said pivot axis, and said lever having a second portion remote from said pivot axis; and a pressure responsive control assembly sealing said valve chamber, said control assembly having a movable member coupled to the second portion of said lever to cause said lever to pivot about said pivot axis in response to pressure variations in said valve chamber;

wherein:

said wall passageway includes a smooth cylindrical bore portion; and said orifice-containing structure is formed unitarily as a portion of said plunger guide with said plunger guide portion having an exterior cylindrical surface sized to fit in said wall passageway bore portion, an interior transverse partition formed with said valve seat extending into said plunger guide interior chamber and said passage extending through said partition.

3. The regulator according to claim 2 wherein said plunger guide portion exterior surface is formed with a circumferential groove and the regulator further includes a resilient sealing ring disposed in said groove.

4. In a gas pressure regulator of the type having a body with an inlet, an outlet, a valve chamber communicating with the outlet and a wall separating the inlet from the valve chamber with the wall having a threaded passageway communicating with the inlet and the valve chamber, and a spring loaded diaphragm assembly sealing the valve chamber, a valve subassembly comprising:

orifice-containing structure adapted to provide all gas communication between the inlet and the valve chamber, the orifice-containing structure having a valve seat adapted to extend within the valve chamber and a passage therethrough adapted to communicate with the inlet and the valve seat, the orifice-containing structure having an externally threaded portion adapted to be threadedly engaged in the wall passageway;

a plunger guide adapted to be secured to said body portion in said valve chamber and having an interior chamber with a longitudinal axis aligned with the passage of the orifice-containing structure the plunger guide including an end wall transverse to the longitudinal axis and having an opening communicating with the plunger guide interior chamber and the valve chamber, the orifice-containing structure extending through the plunger guide end wall opening without threadingly engaging said plunger guide so that the valve seat is within the plunger guide interior chamber;

a plunger valve member contained within the plunger guide interior chamber for reciprocating movement along the longitudinal axis toward and away from the valve seat, the plunger valve member having a first end facing the valve seat;

a seal member secured to the plunger valve member first end and adapted to engage said valve seat to seal the passage of the orifice-containing structure when the plunger valve member is moved against the valve seat; and a lever mounted to said plunger guide for pivoting movement about a pivot axis orthogonal to said longitudinal axis, said lever having a first portion remote from said pivot axis and engaging said plunger valve member to move said plunger valve member toward and away from said valve seat as said lever pivots about said pivot axis, and said lever having a second portion remote from said pivot axis and adapted to be coupled to said diaphragm assembly.

5. In a gas pressure regulator of the type having a body with an inlet, an outlet and a valve chamber communicating with the outlet, and a spring loaded diaphragm assembly sealing the valve chamber, a valve subassembly comprising:

orifice-containing structure adapted to provide all gas communication between the inlet and the valve chamber, the orifice-containing structure having a valve seat adapted to extend within the valve chamber and a passage therethrough adapted to communicate with the inlet and the valve seat;

a plunger guide adapted to be secured to said body portion in said valve chamber and having an interior chamber with a longitudinal axis aligned with the passage of the orifice-containing structure;

a plunger valve member contained within the plunger guide interior chamber for reciprocating movement along the longitudinal axis toward and away from the valve seat, the plunger valve member having a first end facing the valve seat;

a seal member secured to the plunger valve member first end and adapted to engage said valve seat to seal the passage of the orifice-containing structure when the plunger valve member is moved against the valve seat; and a lever mounted to said plunger guide for pivoting movement about a pivot axis orthogonal to said longitudinal axis, said lever having a first portion remote from said pivot axis and engaging said plunger valve member to move said plunger valve member toward and away from said valve seat as said lever pivots about said pivot axis, and said lever having a second portion remote from said pivot axis and adapted to be coupled to said diaphragm assembly;

wherein:

the regulator body has a wall separating the inlet from the valve chamber, with the wall having a passageway with a smooth cylindrical bore portion communicating with the inlet and the valve chamber; and the orifice-containing structure is formed unitarily as a portion of the plunger guide with the plunger guide portion having an exterior cylindrical surface sized to fit in the wall passageway bore portion, an interior transverse partition formed with the valve seat extending into the plunger guide interior chamber and the passage extending through the partition.

6. The valve subassembly according to claim 5 wherein the plunger guide portion exterior surface is formed with a circumferential groove and the valve subassembly further includes a resilient sealing ring disposed in the groove.

7. A drop-in valve subassembly for a diaphragm-type gas pressure regulator comprising:

a plunger guide having a body portion with an interior chamber and a mounting portion adapted to be secured to the interior of the gas pressure regulator, the body portion having an opening for gas communication with the interior chamber;

a plunger valve member arranged for linear sliding motion within the interior chamber of the plunger guide;

a seal mentor secured to the plunger valve member and adapted to cooperate with an inlet orifice valve seat so as to regulate gas flow into the regulator;

a control lever having a through-bore and first and second portions each remote from the through-bore; and a lever pin extending through the control lever through-bore and mounted to the plunger guide mounting portion to define a pivot axis for the control lever which is orthogonal to the line of motion of the plunger valve member;

wherein the control lever first portion engages the plunger valve member so as to move the plunger valve member as the control lever pivots about the pivot axis and the control lever second portion is adapted to be coupled to the regulator diaphragm; and wherein the plunger guide body portion includes a transverse partition between the plunger guide body portion opening and the interior chamber, the partition being formed with the inlet orifice value seat as a unitary part thereof and a passage extending through the partition and the valve seat, the passage providing all gas communication between the plunger guide portion opening and the interior chamber.

* * * * *